Patented Dec. 28, 1937

2,103,443

UNITED STATES PATENT OFFICE 2,103,443

METHOD FOR THE SOFTENING OF DOUGH

Arnold K. Balls and Walter S. Hale, Washington, D. C., dedicated to the free use of the People of the United States No Drawing. Application September 26, 1935, Serial No. 42,248

2 Claims. (Cl. 99—90)

(Granted under the act of March 3, 1883, as amended April 30, 1928; 370 O. G. 757)

This application is made under the act of March 3, 1883, as amended by the act of April 30, 1928, and the invention herein described and claimed may be used by or for the Government for governmental purposes without the payment to us of any royalty thereon.

We hereby dedicate the invention herein described to the free use of the People of the United States to take effect upon the granting of a patent to us.

We have found that a protein-splitting enzyme of the papain type exists in many kinds of grain, and also—to some extent—in the flour made therefrom. This enzyme normally exists partly in the active form, partly in the inactive form. The inactive form, as is the case with other papainases, may be activated by the addition of sulphydryl compounds, such as cysteine, and by other well-known processes described in the literature for the activation of papain and similar enzymes.

The effect of this flour proteinase in the manufacture of bread and the like products is to soften the dough. The softening occurs during the period in which the flour is moist, prior to baking; in other words, during the various fermenting periods to which dough is subjected. The softening is presumably due to an hydrolysis of the "gluten" and tends to render the dough more plastic and apparently more fluid.

Some softening of the dough is an advantage in the baking industry, but generally speaking ordinary doughs are apt to soften more readily than is desirable. This is especially true in the manufacture of bread. On the other hand, however, some types of wheat are occasionally encountered, of which the reverse is true. It would be of advantage to the baker if such flours could be made to yield a somewhat softer dough, and it is the purpose of the present invention to do this.

We have found that there is usually sufficient of the protein-splitting enzyme present in the flour to soften such doughs, but that this enzyme is for the most part in the inactive condition. It is not necessary to add additional enzyme to the dough, but only to activate the proteinase already present.

We have found that the addition of sulphydryl compounds to the dough at any convenient stage of its preparation is capable of producing a softer dough. The amount so required is exceedingly small; when too much is used, the dough becomes too sticky and fluid.

While the sulphydryl compounds in general are able to produce this effect, as is shown by the action of cysteine or hydrogen sulphide, and while the use of other methods of activating papain are also effective (such as the introduction of bisulphites or the use of a dehydrogenase plus a suitable hydrogen donator—all of these methods which appear to reduce the enzyme to its active state) we have found that glutathione gives highly satisfactory and consistent results, and we recommend its use. A natural product, for example pineapple juice, that contains a papainase activator, may also be used.

In order to use glutathione for this purpose it is only necessary to add an amount of this peptide (preferably in solution or distributed in any suitable carrier substance) to the flour or to the dough mixture at such a time that it may be evenly incorporated into the dough during the "mixing process." The amount of glutathione required varies somewhat with the characteristics of the flour used, but in general it lies between one-half, and one and a half milligrams of the peptide per pound of flour used. It can be readily seen that the many differences which exist in methods of handling dough, the time, temperature and amount of water used, and the like, and above all the "hardness" of the particular flour used, affect the quantity of enzyme activator necessary to soften the dough to the degree desired by the baker.

Having thus described our invention, what we claim for Letters Patent is:

1. A method for the softening of dough which comprises incorporating with any of the ingredients used for the preparation of dough glutathione.

2. A method for the softening of dough which comprises incorporating with dough glutathione.

ARNOLD K. BALLS.
WALTER S. HALE.